US011595831B2

(12) United States Patent
Barabell et al.

(10) Patent No.: US 11,595,831 B2
(45) Date of Patent: Feb. 28, 2023

(54) CONTROLLER REDUNDANCY IN A CENTRALIZED RADIO ACCESS NETWORK

(71) Applicant: CommScope Technologies LLC, Hickory, NC (US)

(72) Inventors: Arthur J. Barabell, Sudbury, MA (US); Shanthakumar Ramakrishnan, Westford, MA (US); Nikhil Niranand Utane, Bengaluru (IN); Manoj S Kolakur, Bengaluru (IN); Nagi Jayaraman Mahalingam, San Diego, CA (US)

(73) Assignee: CommScope Technologies LLC, Hickory, NC (US)

( * ) Notice: Subject to any disclaimer, the term of this patent is extended or adjusted under 35 U.S.C. 154(b) by 174 days.

(21) Appl. No.: 16/588,193

(22) Filed: Sep. 30, 2019

(65) Prior Publication Data
US 2020/0107204 A1   Apr. 2, 2020

Related U.S. Application Data

(60) Provisional application No. 62/739,714, filed on Oct. 1, 2018.

(51) Int. Cl.
*H04W 24/02* (2009.01)
*H04W 16/02* (2009.01)
(Continued)

(52) U.S. Cl.
CPC ............ *H04W 24/02* (2013.01); *H04W 16/02* (2013.01); *H04W 16/32* (2013.01); *H04W 84/042* (2013.01); *H04W 88/085* (2013.01)

(58) Field of Classification Search
CPC ..... H04W 16/02; H04W 16/32; H04W 24/02; H04W 84/042; H04W 88/085; H04W 16/18; H04W 24/04
See application file for complete search history.

(56) References Cited

U.S. PATENT DOCUMENTS

2007/0177552 A1\* 8/2007 Wu ..................... H04W 88/08
370/335
2012/0236708 A1   9/2012 Kompella et al.
(Continued)

FOREIGN PATENT DOCUMENTS

CN          107889118 A     4/2018

OTHER PUBLICATIONS

Beekhof, "Pacemaker 1.1 Clusters from Scratch Creating Active/Passive and Active/Active Clusters on Fedora", at least as early as Jan. 9, 2014, pp. 1-118, Pacemaker.
(Continued)

*Primary Examiner* — Derrick V Rose
(74) *Attorney, Agent, or Firm* — Fogg & Powers LLC

(57) ABSTRACT

One embodiment is directed to a system comprising a plurality of controllers and a plurality of radio points that provide wireless service to user equipment. The system is configured to serve a plurality of logical cells. The system is configured so that each logical cell is served by a respective group of the radio points. The system is configured to associate each group of radio points with a respective one or more controllers in order for the respective one or more controllers to serve the respective logical cell associated with that group of radio points while associated therewith. The system is configured to use a protection scheme in which the respective group of radio points that serves each logical cell does not change in the event of a fail-over that causes the one or more controllers associated with that group of radio points to change.

22 Claims, 8 Drawing Sheets

(51) Int. Cl.
  *H04W 16/32* (2009.01)
  *H04W 84/04* (2009.01)
  *H04W 88/08* (2009.01)

(56) References Cited

U.S. PATENT DOCUMENTS

| | | |
|---|---|---|
| 2013/0150107 A1 | 6/2013 | Lahtinen et al. |
| 2014/0031049 A1 | 1/2014 | Sundaresan et al. |
| 2014/0226736 A1 | 8/2014 | Niu et al. |
| 2014/0349667 A1 | 11/2014 | Hahn et al. |
| 2016/0242147 A1 | 8/2016 | Tarlazzi et al. |
| 2017/0180982 A1* | 6/2017 | Choi .................. H04W 76/11 |
| 2017/0238361 A1 | 8/2017 | Pawar et al. |
| 2018/0287696 A1* | 10/2018 | Barbieri ............... H04W 36/22 |

OTHER PUBLICATIONS

Beekhof, "Pacemaker 1.1 Configuration Explained An A-Z guide to Pacemaker's Configuration Options", at least as early as Nov. 14, 2017, pp. 1-204, Pacemaker.

Corosync, "The Corosync Cluster Engine", at least as early as Sep. 24, 2019, p. 1.

Redhat, "4.4 Managing Cluster Nodes", at least as early as Dec. 2, 2019, pp. 1-4, RedHat, https://access.redhat.com/documentation/en-us/red_hat_enterprise_linux/7/html/high_availability_add-on_reference/s1_clusternodemanage-naar.

International Searching Authority, "International Search Report and Written Opinion from PCT Application No. PCT/US2019/053845", from Foreign Counterpart to U.S. Appl. No. 16/588,193, pp. 1-8, Published: WO.

3GPP TSG-RAN WG3 Meeting #95-bis, "Cardinality in gNB-CU/DU deployment", Document for Discussion and Decision, Spokane, USA, Apr. 3-7, 2017, pp. 1 through 3.

European Patent Office, "Extended European Search Report from EP Application No. 19868869.9", from Foreign Counterpart to U.S. Appl. No. 16/588,193, filed Jun. 1, 2022, pp. 1 through 11, Published: EP.

Haddaji et al., "BackHauling-as-a-Service (BHaaS) for 5G Optical Sliced Networks: An Optimized TCO Approach", Journal of Lightwave Technology, vol. 36, No. 18, Sep. 15, 2018, pp. 4006 through 4017, (c) 2018 IEEE.

* cited by examiner

CONTROLLER REDUNDANCY IN A CENTRALIZED RADIO ACCESS NETWORK

CROSS-REFERENCE TO RELATED APPLICATIONS

This application claims the benefit of U.S. Provisional Patent Application Ser. No. 62/739,714, filed on Oct. 1, 2018, which is hereby incorporated herein by reference in its entirety.

BACKGROUND

A centralized radio access network (C-RAN) can be used to implement base station functionality for providing wireless service to user equipment (UE). Typically, for each cell implemented by the C-RAN, one or more baseband units (BBUs) (also referred to here as "baseband controllers" or simply "controllers") interact with multiple remote units (also referred to here as "radio points" or "RPs"). Each controller is coupled to the radio points over front-haul communication links or a front-haul network.

In a C-RAN, each controller can present a single point of failure. In general, when an entity presents a single point of failure for a system, a redundant entity can be provided in order to protect against a failure of the protected entity. However, the system typically must be configured to switch over to using the redundant entity upon the failure of the protected entity. Also, providing redundancy in a system adds cost to the system. The challenges with adding redundancy to a system are of special concern with a system as complex as a C-RAN.

SUMMARY

One embodiment is directed to a system to provide wireless service comprising a plurality of controllers and a plurality of radio points. Each of the radio points is associated with at least one antenna and remotely located from the controllers, wherein the plurality of radio points is communicatively coupled to the controllers using a front-haul network. The controllers and the plurality of radio points are configured to implement a plurality of base stations in order to provide wireless service to a plurality of user equipment (UEs). Each of the controllers is communicatively coupled to a core network of a wireless service provider. The system is configured to serve a plurality of logical cells. The system is configured so that each logical cell is served by a respective group of the radio points. The system is configured to associate each group of radio points with a respective one or more controllers in order for the respective one or more controllers to serve the respective logical cell associated with that group of radio points while associated therewith. The system is configured to use a protection scheme in which the respective group of radio points that serves each logical cell does not change in the event of a fail-over that causes the one or more controllers associated with that group of radio points to change.

Another embodiment is directed to a method of implementing a protection scheme in a system configured to provide wireless service that comprises a plurality of controllers and a plurality of radio points. Each of the radio points is associated with at least one antenna and remotely located from the controllers. The plurality of radio points is communicatively coupled to the controllers using a front-haul network. The controllers and the plurality of radio points are configured to implement a plurality of base stations in order to provide wireless service to a plurality of user equipment (UEs). Each of the controllers is communicatively coupled to a core network of a wireless service provider. The system is configured to serve a plurality of logical cells. The system is configured so that each logical cell is served by a respective group of the radio points. The method comprises associating each group of radio points with a respective one or more controllers in order for the respective one or more controllers to serve the respective logical cell associated with that group of radio points while associated therewith and using a protection scheme in which the respective group of radio points that serves each logical cell does not change in the event of a fail-over that causes the one or more controllers associated with that group of radio points to change.

Other embodiments are disclosed.

The details of various embodiments are set forth in the accompanying drawings and the description below. Other features and advantages will become apparent from the description, the drawings, and the claims.

DRAWINGS

Figure 3:
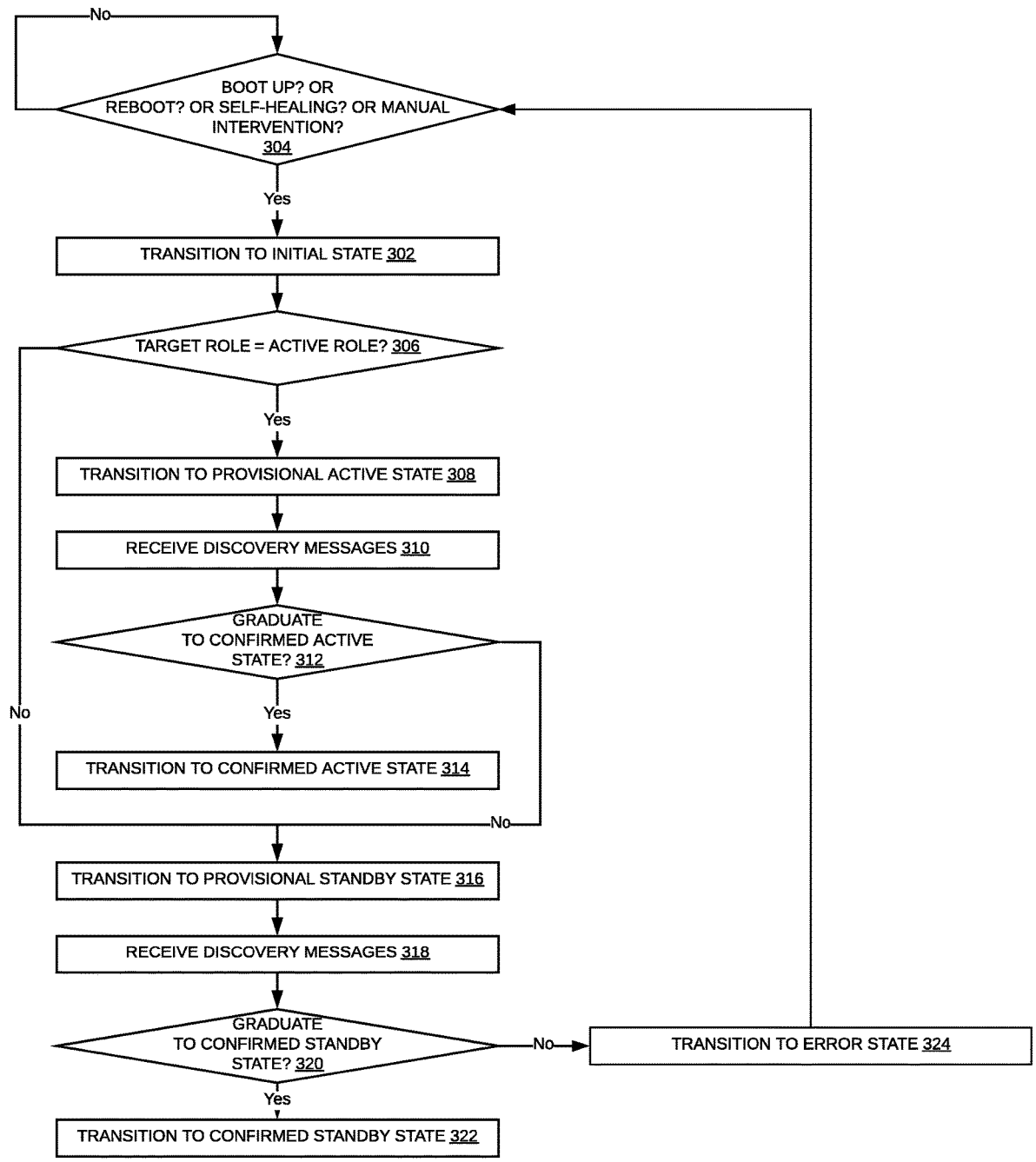

FIG. 3 comprises a high-level flowchart illustrating one exemplary embodiment of a method of determining in which state and role a controller in a C-RAN operates.

Figure 4:
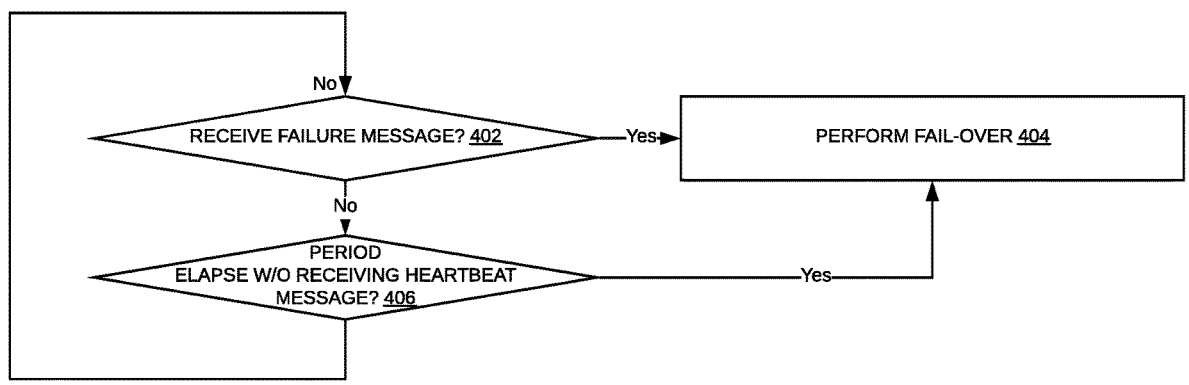

FIG. 4 comprises a high-level flow chart illustrating one exemplary embodiment of a method of determining when to perform a fail-over in a C-RAN.

Figure 5:
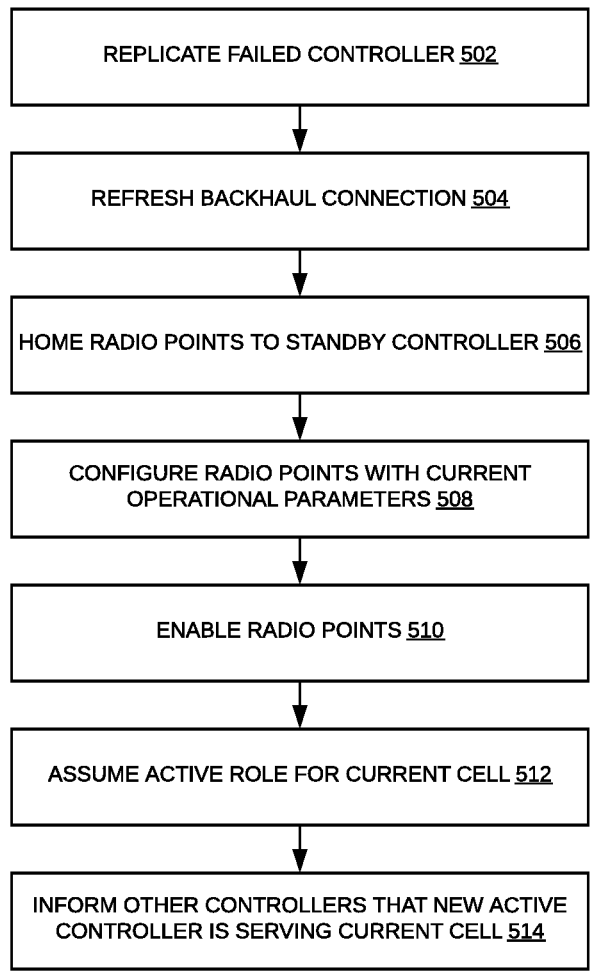

FIG. 5 comprises a high-level flow chart illustrating one exemplary embodiment of a method of performing a fail-over in connection with the failure of an active controller in a C-RAN.

Like reference numbers and designations in the various drawings indicate like elements.

DETAILED DESCRIPTION

Figure 1:
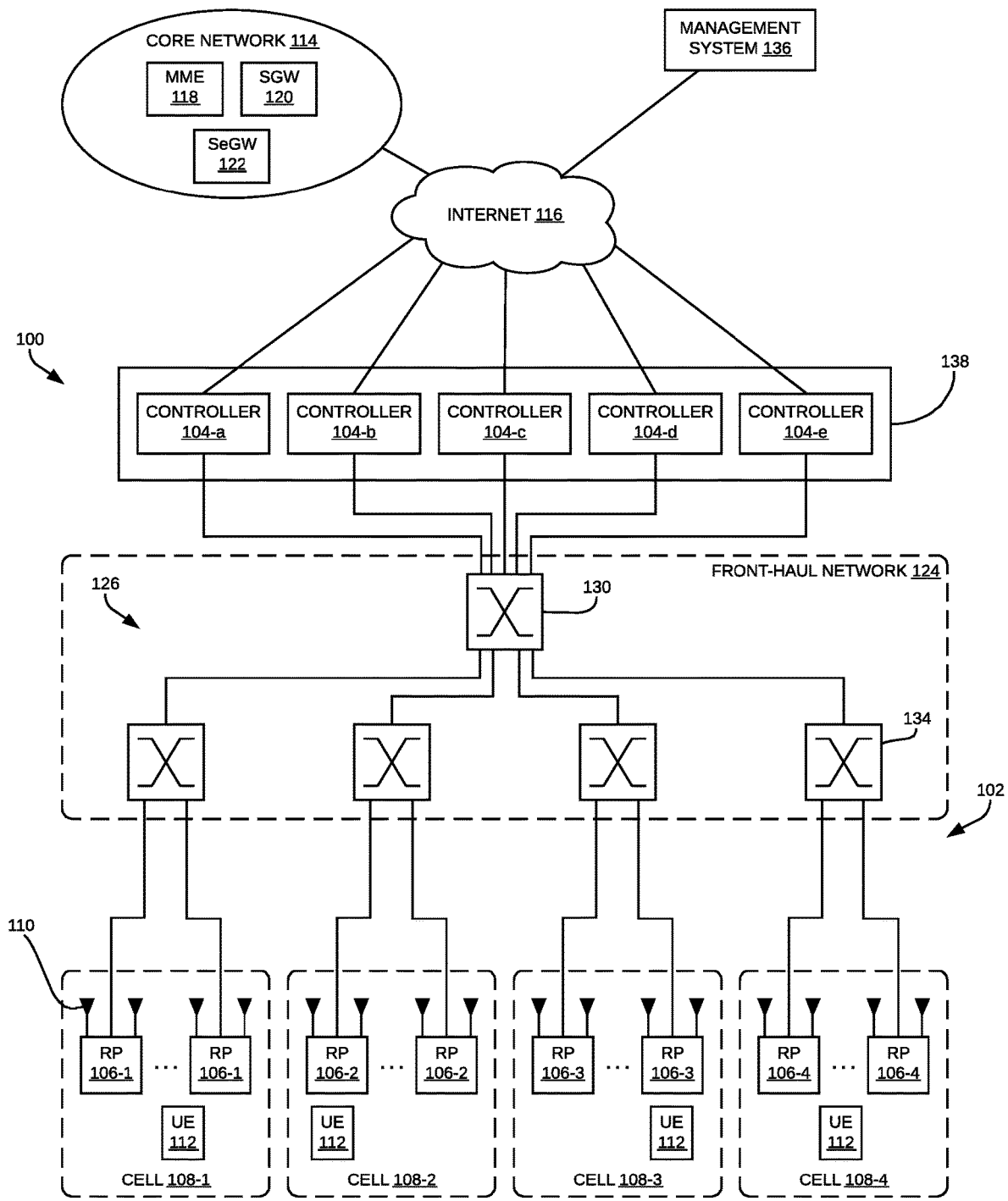
FIG. 1 is a block diagram illustrating one exemplary embodiment of a radio access network (RAN) system.

FIG. 1 is a block diagram illustrating one exemplary embodiment of a radio access network (RAN) system 100 in which the controller redundancy techniques described here can be implemented. The system 100 is deployed at a site 102 to provide wireless coverage and capacity for one or more wireless network operators. The site 102 may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the system 100 is implemented at least in part using a C-RAN architecture that employs at least one baseband unit 104 and multiple radio points (RPs) 106. The system 100 is also referred to here as a "C-RAN system" 100. Each RP 106 is remotely located from the baseband unit 104. Also, in this exemplary embodiment, at least one of the RPs 106 is remotely located from at least one other RP 106. The baseband unit 104 and RPs 106 serve at least one cell 108. The baseband units 104 are also referred to here as "baseband controllers" 104 or just "controllers" 104.

Each RP 106 includes or is coupled to one or more antennas 110 via which downlink RF signals are radiated to user equipment (UE) 112 and via which uplink RF signals transmitted by UEs 112 are received. More specifically, in the example shown in FIG. 1, each RP 106 comprises two antennas 110. Each RP 106 can include or be coupled to a different number of antennas 110.

The system 100 is coupled to the core network 114 of each wireless network operator over an appropriate back-haul. In the exemplary embodiment shown in FIG. 1, the Internet 116 is used for back-haul between the system 100 and each core network 114. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, the controller 104 and RPs 106 together are used to implement an LTE Evolved Node B (also referred to here as an "eNodeB" or "eNB") that is used to provide user equipment 112 with mobile access to the wireless network operator's core network 114 to enable the user equipment 112 to wirelessly communicate data and voice (using, for example, Voice over LTE (VoLTE) technology). This eNodeB can be a macro eNodeB or a home eNodeB (HeNB).

Also, in this exemplary LTE embodiment, each core network 114 is implemented as an Evolved Packet Core (EPC) 114 comprising standard LTE EPC network elements such as, for example, a mobility management entity (MME) 118 and a Serving Gateway (SGVV) 120. Each controller 104 communicates with the MME 118 and SGW 120 in the EPC core network 114 using the LTE S1 interface. Also, each controller 104 communicates with other eNodeBs using the LTE X2 interface. For example, each controller 104 can communicate via the LTE X2 interface with an outdoor macro eNodeB (not shown) or another controller 104 in the same cluster 138 (described below) implementing a different cell 108.

If the eNodeB implemented using one or more controllers 104 is a home eNodeB, the core network 114 can also include a Home eNodeB Gateway (not shown) for aggregating traffic from multiple home eNodeBs.

The controllers 104 and the radio points 106 can be implemented so as to use an air interface that supports one or more of frequency-division duplexing (FDD) and/or time-division duplexing (TDD). Also, the controllers 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controllers 104 and the radio points 106 can implement one or more of the LTE transmission modes. Moreover, the controllers 104 and/or the radio points 106 can be configured to support multiple air interfaces and/or to support multiple wireless operators.

The controllers 104 are communicatively coupled to the radio points 104 using a front-haul network 124. In the exemplary embodiment shown in FIG. 1, the front-haul 124 that communicatively couples each controller 104 to one or more RPs 106 is implemented using a standard switched ETHERNET network 126. However, it is to be understood that the front-haul between the controllers 104 and RPs 106 can be implemented in other ways.

The switched Ethernet network 126 comprises one or more Ethernet switches. In the exemplary embodiment shown in FIG. 1, the switched Ethernet network 126 comprises an aggregation layer including one or more aggregation Ethernet switches 130 and an access layer including one or more access Ethernet switches 134. Other Ethernet network topologies can be used (for example, there may be additional layers (or hops) of Ethernet switches between (or within one or more of) the aggregation layer and the access layer or entirely different topologies can be used).

Each controller 104 is communicatively coupled to one or more of the aggregation switches 130 via a respective one or more Ethernet links (only one of which is shown for ease of illustration). Each RP 106 is communicatively coupled to one or more of the access switches 134 via a respective one or more Ethernet links (only one of which is shown for ease of illustration). Also, some of the switches 130 and 134 are communicatively coupled to each over via one or more Ethernet links.

Generally, one or more nodes in a C-RAN perform analog radio frequency (RF) functions for the air interface as well as digital Layer 1, Layer 2, and Layer 3 (of the Open Systems Interconnection (OSI) model) functions for the air interface.

In the exemplary embodiment shown in (L1) FIG. 1, each baseband controller 104 comprises Layer-1 (L1) functionality, Layer-2 (L2) functionality, and Layer-3 (L3) functionality configured to perform at least some of the Layer-1 processing, Layer-2 processing, and Layer-3 processing, respectively, for the LTE air interface implemented by the RAN system 100. Each RP 106 includes Layer-1 functionality that implements any Layer-1 processing for the air interface that is not performed in the controllers 104 and one or more radio frequency (RF) circuits (not shown) that implement the RF front-end functions for the air interface and the one or more antennas 110 associated with that RP 106.

Generally, for each cell 108 implemented by the C-RAN 100, the corresponding controller 104 performs the air-interface Layer-3 (L3) and Layer-2 (L2) processing as well as at least some of the air-interface Layer-1 (L1) processing for the cell 108, where each of the radio points 106 serving that cell 108 perform the L1 processing not performed by the controller 104 as well as implementing the analog RF transceiver functions.

Different splits in the air-interface processing between the controller 104 and the radio points 106 can be used. In one example, each baseband controller 104 can be configured to perform all of the digital Layer-1, Layer-2, and Layer-3 processing for the air interface, while the RPs 106 (specifically, the RF circuits) implement only the RF functions for the air interface and the antennas 108 associated with each RP 106. In that case, in-phase and quadrature (IQ) data representing time-domain symbols for the air interface is communicated between the controller 104 and the RPs 106. Other splits can be used and data can be communicated between the controllers 104 and the radio points 106 in other formats. In the following description, the fronthaul data communicated between the controllers 104 and the radio points 106 for the air interface is generally referred to as "IQ data" even though such fronthaul data can take many forms, including forms that are not IQ data.

Also, the form in which IQ data is communicated in the downlink direction (that is, the direction from the controller 104 to the RPs 106) can differ from the form in which IQ data is communicated in the uplink direction (that is, the direction from the RPs 106 to the controller 104). Also, for a given direction (downlink or uplink), not all fronthaul data needs to be communicated in the same form (that is, the fronthaul data for different channels or for different resource blocks can be communicated in different ways).

Data can be front-hauled between the controllers 104 and RPs 106 in other ways.

Each controller 104 and RP 106 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106, and the system 100 more generally, can be implemented in other ways.

In the exemplary embodiment shown in FIG. 1, a management system 136 is communicatively coupled to the controllers 104 and RPs 106, for example, via the Internet 116 and ETHERNET network 126 (in the case of the RPs 106).

In the exemplary embodiment shown in FIG. 1, the management system 136 communicates with the various elements of the system 100 using the Internet 116 and the ETHERNET network 126. Also, in some implementations, the management system 136 sends and receives management communications to and from the controllers 104, each of which in turn forwards relevant management communications to and from the RPs 106. The management system 136 can comprise a proprietary management system provided by the vendor of the C-RAN system 100 or a Home eNodeB management system (HeNB MS) (or other eNodeB management system) used by an operator to manage Home eNodeBs (or other eNodeBs) deployed in its network.

Each controller 104 can also implement a management interface by which a user is able to directly interact with the controller 104. This management interface can be implemented in various ways including, for example, by implementing a web server that serves web pages that implement a web-based graphical user interface for a user to interact with the controller 104 using a web browser and/or by implementing a command-line interface by which a user is able to interact with the controller 104, for example, using secure shell (SSH) software.

In the exemplary embodiment shown in FIG. 1, the system 100 comprises multiple controllers 104 that are grouped together into a cluster 138. Each cluster 138 has an associated set of RPs 106 that have been assigned to that cluster 138 and that are served by the controllers 104 included in that cluster 138. Each controller 104 in the cluster 138 maintains a list of the RPs 106 assigned to the cluster 138. This list is also referred to here as the "RP whitelist" and comprises an identifier for each RP 106 that has been assigned to the cluster 138. In this exemplary embodiment, the identifier for each RP 106 that is used in the RP whitelist is a media access control (MAC) address assigned to that RP 106.

Each of the controllers 104 in the cluster 138 is configured to operate in one of (at least) two roles at any given point in time. The first role is referred to here as the "active" role, and each controller 104 that is operating in the first role is also referred to here as an "active" controller 104. While each controller 104 operates in the active role, the controller 104 actively serves a cell 108. The second role is referred to here as the "standby" role, and a controller 104 that is operating in the second role is also referred to here as a "standby" controller 104. While a controller 104 operates in the standby role, the controller 104 serves as a backup or standby controller 104 for the active controllers 104 in the cluster 138.

Each cell 108 is assigned a respective subset of the RPs 106. The assigned subset of RPs 106 is used for serving that cell 108. This subset is also referred to here as the "RP group" assigned to the cell 108. In this embodiment, the RP group assigned to each cell 108 does not change in response to a change in the one or more controllers 104 serving that cell 108. As a result of this, the RF plan established for the cluster 138 and the borders established for each cell 108 are maintained even if one or more controllers 104 serving any given cell 108 changes (for example, in response to a fail-over being performed). More specifically, the C-RAN 100 is configured to use a protection scheme in which the respective group of radio points 106 that serve each of the cells 108 does not change in the event of a fail-over that causes a standby controller 104 operating in the standby role to take over serving a cell 108 in place of an active controller 104 that was serving that cell 108.

Also, the C-RAN 100 is configured so that the "in-use" parameters used by one or more active controllers 104 to serve each cell 108 can be replicated by the one or more standby controllers 104 in the event that a fail-over is performed. These "in-use" parameters can include, for example, all parameters that are manually configured and all parameters determined via self-organizing network (SON) processes. In general, the in-use parameters include all parameters one or more controllers 104 would need to start serving a cell 108.

The controllers 104 terminate the back-haul connections with the core network 114, and each LTE SIB1 Cell Identity is associated with the one or more controllers 104 serving each cell 108. Therefore, in order to enable the cells 108 to be defined and configured independently of the LTE SIB1 Cell Identity assigned to them (or to the one or more controllers 104 serving them) the cells 108 are assigned a separate identifier (referred to here as the "virtual cell identifier" or "virtual cell ID") that is used in the context of the C-RAN 100. The group of RPs 106 assigned to each cell 108 can be associated with the virtual cell ID assigned to that cell 108. That is, from the perspective of the C-RAN 100, the cells 108 are logical entities (or logical cells), with each such logical cell assigned a virtual cell identifier that can be used to identify that logical cell.

As used here, "homing" a group of RPs 106 refers to the process of associating a group of RPs 106 assigned to a particular cell 108 with one or more controllers 104 of the cluster 138 that will serve that cell 108 and that group of RPs 106. This homing process also associates a LTE SIB1 Cell Identity (which is associated with the one or or serving controllers 104) with a virtual cell ID (which is associated with the group of RPs 106). That is, the homing process associates the logical cell used in the context of the C-RAN 100 with a cell identity recognized by the core network 114.

In the exemplary embodiment described below, each cell 108 is served by one controller 104 and the system 100 is configured to use an N+1 protection scheme in which the set of standby controllers 104 includes only one controller 104.

That is, in the absence of any faults, all but one of the controllers 104 operate in the active role and one controller 104 operates in the standby role. However, it is to be understood that some of the protection techniques described below can be used in other embodiments, for example, in embodiments in which one or more of the cells 108 are served by more than one controller 104, embodiments in which one or more of the controllers 104 serve more than one cell 108, and/or embodiments in which more than one controller 104 serves as a standby controller 104 for the cluster 138.

FIGS. 2A-2D illustrate the operation of the N+1 protection scheme in this embodiment. In this example, the cluster 138 comprises five controllers 104 that serve four separate cells 108 using four groups of RPs 106. That is, in this example, N equals 4 in the N+1 protection scheme.

In this example, the controllers 104 are individually referenced in FIGS. 2A-2D as 104-*a*, 104-*b*, 104-*c*, 104-*d*, and 104-*e*, respectively. The cells 108 are individually referenced in FIGS. 2A-2D as 108-1, 108-2, 108-3, and 108-4, respectively. The RPs 106 assigned to each of the cells 108-1, 108-2, 108-3, and 108-4 are individually referenced in FIGS. 2A-2D as 106-1, 106-2, 106-3, and 106-4, respectively.

Figure 2A:
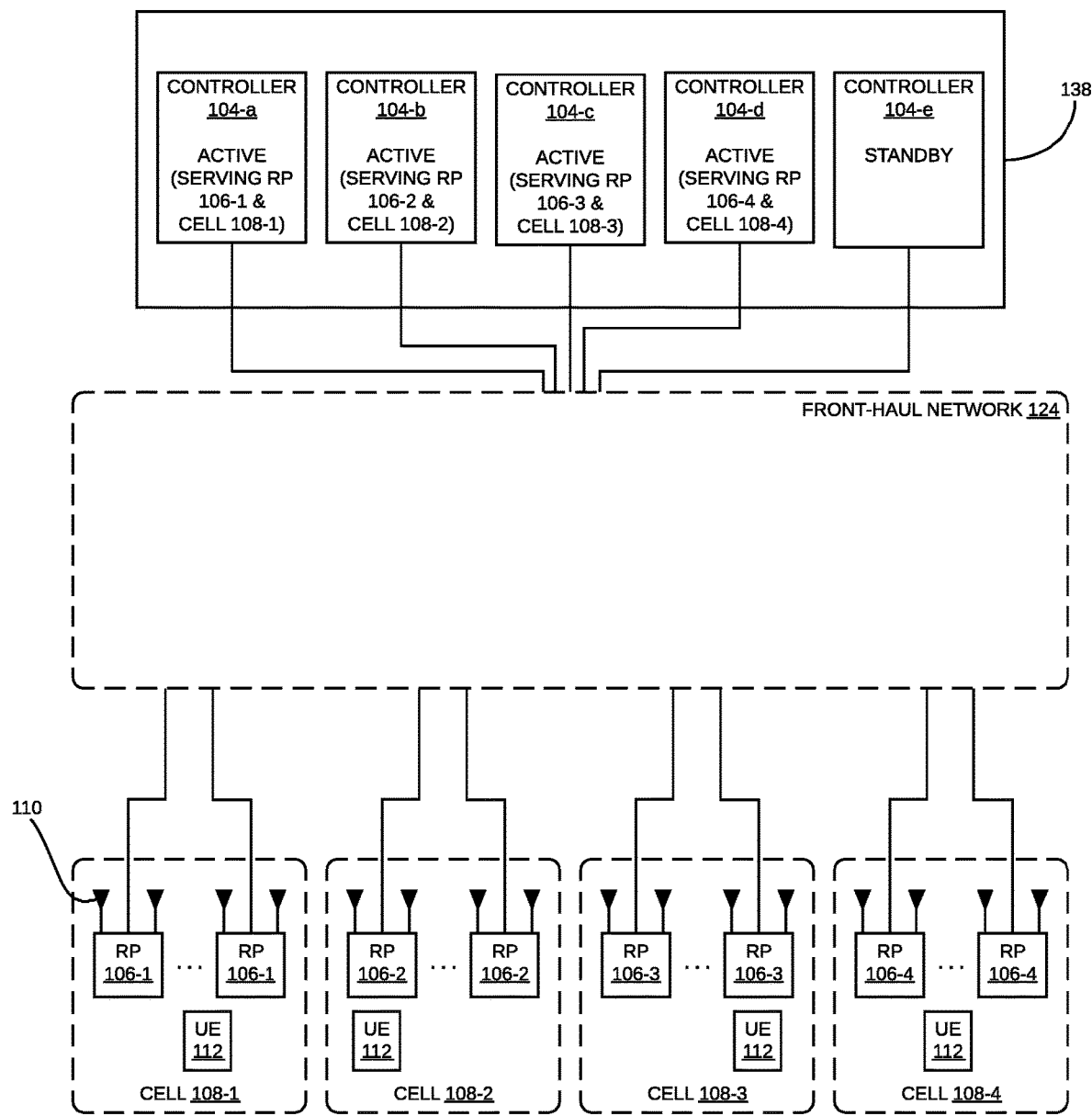
FIGS. 2A-2D illustrate the operation of an N+1 protection scheme.

FIG. 2A shows a first state of the system 100 in which there are no faults, and in which controllers 104-*a*, 104-*b*, 104-*c*, and 104-*d* operate in the active role and serve cells 108-1, 108-2, 108-3, and 108-4, respectively. Also, in this first state, RPs 106-1 are used to serve cell 108-1 and are homed to controller 104-*a*, RPs 106-2 are used to serve cell 108-2 and are homed to controller 104-*b*, RPs 106-3 are used to serve cell 108-3 and are homed to controller 104-*c*, and RPs 106-4 are used to serve cell 108-4 and are homed to controller 104-*d*. In this first state, controller 104-*e* operates in the standby role.

Figure 2B:
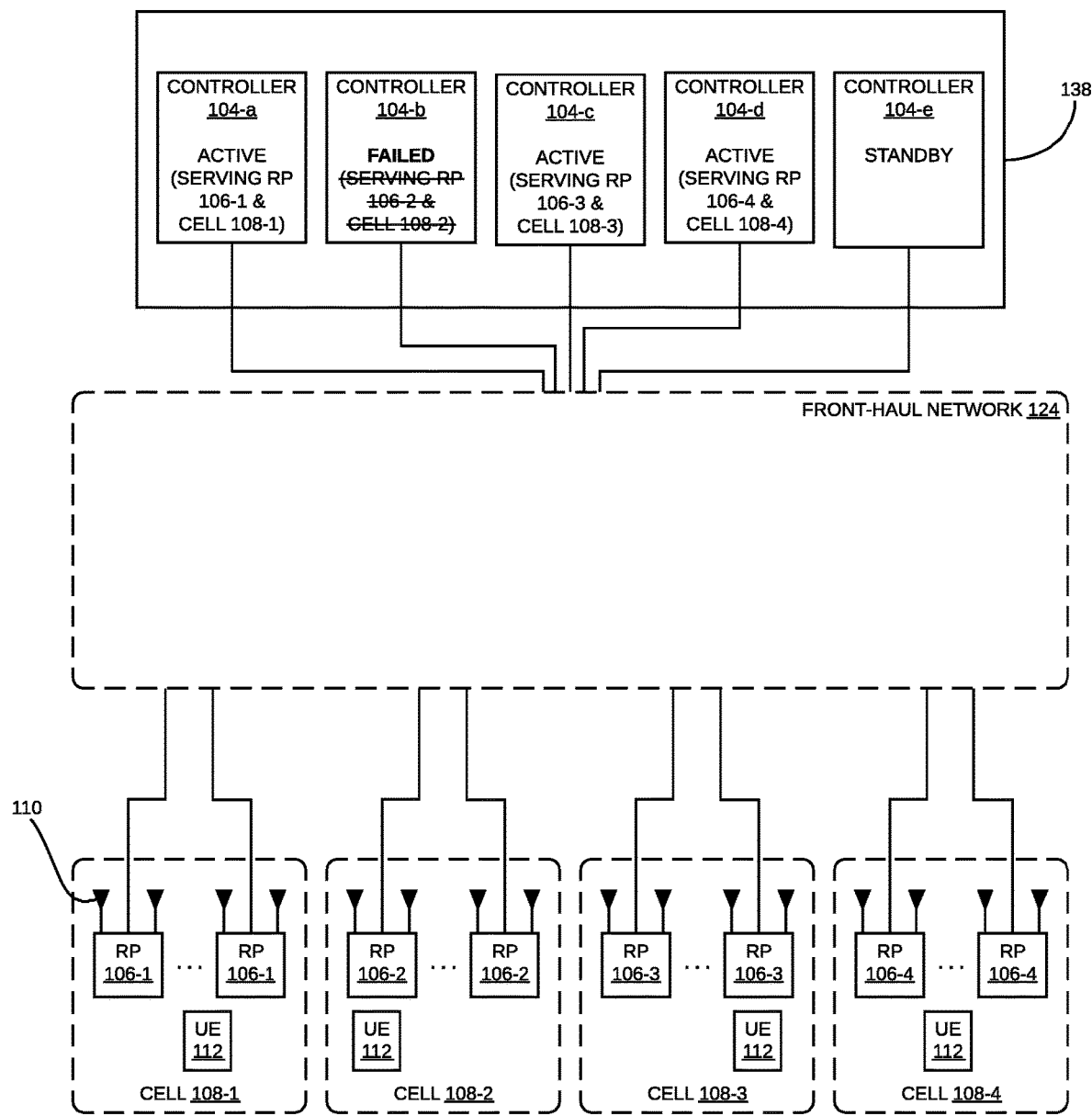

FIG. 2B shows a second state of the system 100 in which controller 104-*b* has failed and is no longer able to serve cell 108-2 and the associated group of RPs 106-2.

Figure 2C:
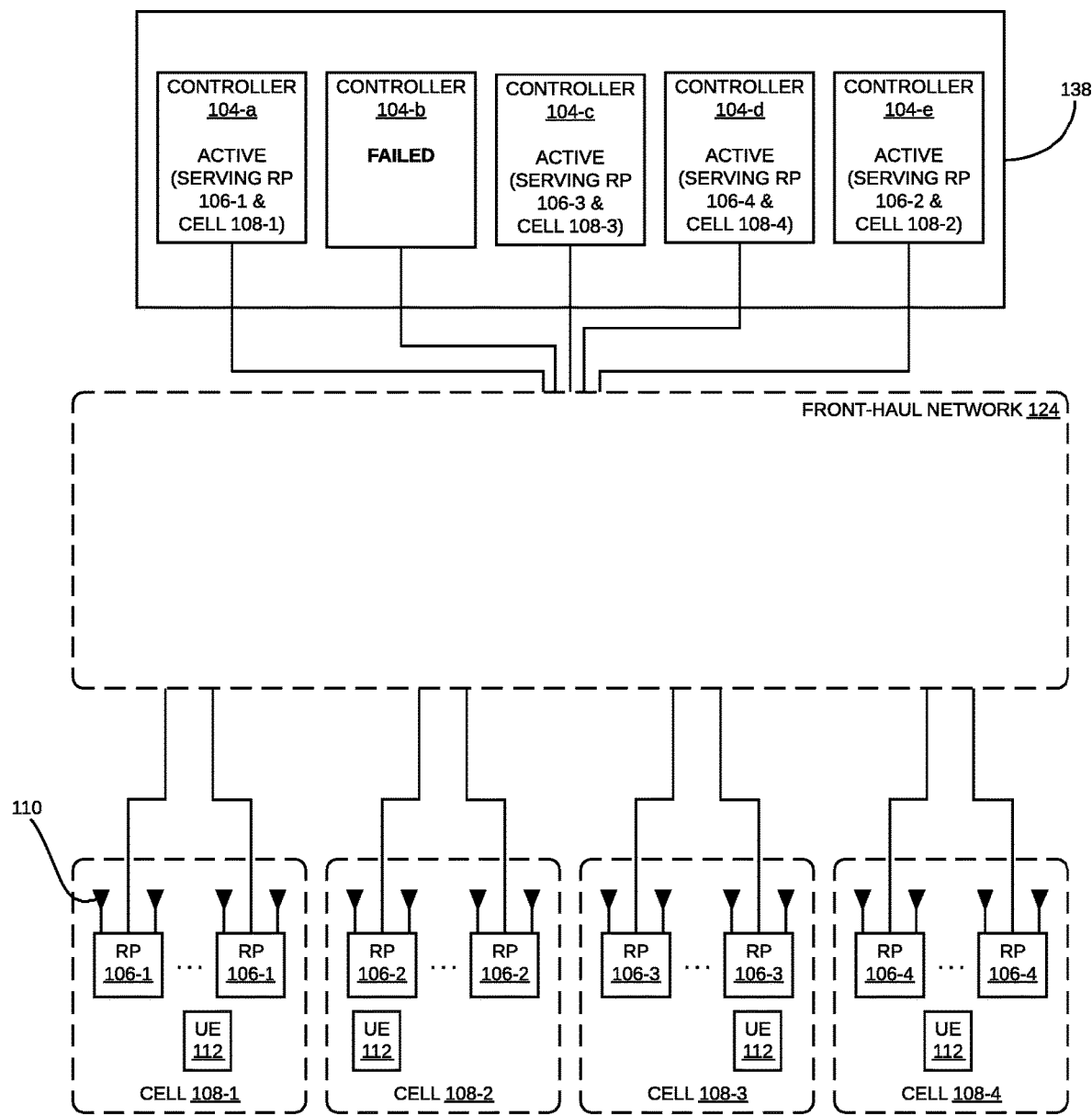

In response to the failure of controller 104-*b*, the standby controller 104-*e* changes its operating role in order to operate in the active role and serve as the serving controller for cell 108-2. The associated group of RPs 106-2 is re-homed to controller 104-*e* (instead of controller 104-*b*). Once this fail-over is completed, the system 100 will be in a third state that is shown in FIG. 2C.

Figure 2D:
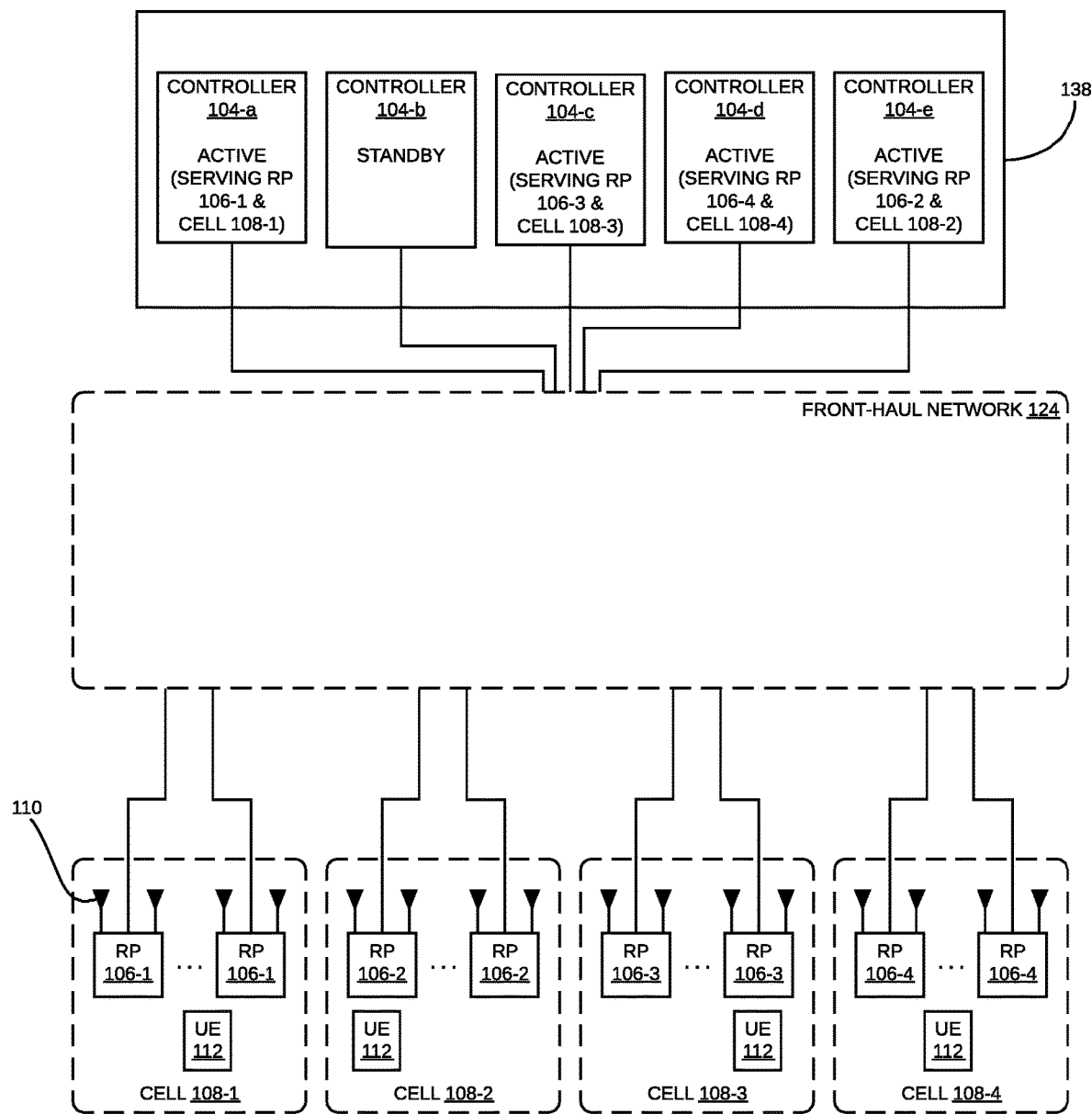

If and when controller 104-*b* becomes operational again and is no longer in a failed state, it operates in the standby role and serves as the backup controller for the cluster 138. This fourth state is shown in FIG. 2D. If and when one of the active controllers 104-*a*, 104-*c*, 104-*d*, or 104-*e* fails, controller 104-*b* will take over for the failed controller and operate in the active role for that failed controller in the same way that controller 104-*e* did in response to the failure of controller 104-*b*.

As described above, in this exemplary embodiment, the system 100 is configured to use a protection scheme in which the respective group of radio points 106 that serve each of the cells 108 does not change in the event of a fail-over that causes a standby controller 104 operating in the standby role to take over serving the cell 108 in place of the active controller 104 that was serving that cell 108 prior to the failure.

As described below in connection with FIGS. 3-5, the protection scheme can comprise a distributed protection scheme in which each of the controllers independently determines whether to operate in the active role or the standby role. Alternatively, the protection scheme can comprise a centralized protection scheme in which one of the controllers 104 operates as a "cluster manager" that controls and manages the protection functions.

Also, in this exemplary embodiment, each controller 104 in the cluster 138 is provisioned with its own eNodeB identifier (either a Macro or Home eNodeB Identifier), LTE SIB1 Cell Identity, and LTE Cell Mode.

In order to enable a standby controller 104 to takeover for a failed active controller 104, the standby controller 104, while operating as the standby controller 104, is configured to establish and maintain a S1 connection with the core network 114. Because the standby controller 104 is not actually serving a cell 108, this S1 connection will only involve control plane traffic communicated between the standby controller 104 and the MME 118. Also, the standby controller 104 exists within the management domain of the relevant management system 136. In general, the standby controller 104 is provisioned with nominal configuration settings appropriate for operating in the standby role, which does not involve actual RAN operational parameters except those signaled by the standby controller 104 to the MME 118 in the LTE S1 SETUP REQUEST message. The standby controller 104 is configured to terminate and ignore S1 messages that are not relevant to it while operating in the standby role.

The active controllers 104 are also configured to establish respective S1 connections with the core network 114. Because the active controllers 104 are serving cells 108, these S1 connection will involve both control and user plane traffic communicated between the standby controller 104 and the MME 118 and the SGW 120.

In order to enable the standby controller 104 to takeover for a failed active controller 104, all of the controllers 104 in the cluster 138 should be able to communicate with all of the RPs 106 assigned to the cluster 138, and all of the RPs 106 assigned to the cluster 138 should be able to communicate with all of the controllers 104. The switched Ethernet network 126 is configured so that at least one logical switchable communication path exists from each controller 104 in the cluster 138 to each of the other controllers 104 in the cluster 138. The switched Ethernet network 126 is also configured so that at least one logical switchable communication path exists from each RP 106 assigned to the cluster 138 to each controller 104 in the cluster 138 and that each RP 106 is no more than four hops away from any controller 104.

In this exemplary embodiment, various virtual local area networks (VLANs) are used for managing and segregating communication flows within the network 126. In this embodiment, three VLANs are used. The first VLAN is used for communicating timing information (for example, Institute of Electrical and Electronics Engineers (IEEE) 1588 Precision Time Protocol (PTP) messages used for synchronizing the controllers 104 an RPs 106) and management information (for example, Simple Object Access Protocol (SOAP) and eXtensible Markup Language (XML) messages) and is referred to here as the "timing" VLAN. The second VLAN is used for communicating IQ data and is referred to here as the "IQ" VLAN.

In this embodiment, the timing and IQ VLANs are configured so that all of the controllers 104 and RPs 106 in the cluster 138 are members of the timing and IQ VLANs.

Also, in this embodiment, for each cell 108 served by the cluster 138, the serving (active) controller 104 transmits downlink timing messages over the timing VLAN by multicasting the downlink timing messages using a respective multicast group defined for that cell 108. That is, each cell 108 served by the cluster 138 has a single downlink timing multicast group assigned to it. In this embodiment, for each cell 108 served by the cluster 138, the RPs 106 transmit uplink timing messages over the timing VLAN by unicasting the messages using the IP address assigned to the serving controller 104 for that cell 108.

In this embodiment, for each cell 108 served by the cluster 138, the serving (active) controller 104 transmits downlink IQ data over the IQ VLAN by multicasting the messages using a respective multicast group defined for that cell 108. That is, each cell 108 served by the cluster 138 has a single downlink IQ data multicast group assigned to it.

In this embodiment, multicast load balancing is used to efficiently use the front-haul capacity for transmitting uplink IQ data. In this embodiment, multiple link aggregation groups (LAGs) are defined for each cell 108, with each LAG having an associated uplink IQ data multicast group associated with it. The switches 130 and 134 in the front-haul 124 are configured to use multicast load balancing using the IEEE Link Aggregation Control Protocol (LACP). In one implementation, twelve uplink IQ data multicast groups (and associated LAGs) are defined for each cell 108.

Also, in this embodiment, for each cell 108 served by the cluster 138, both downlink and uplink management messages are transmitted over the timing VLAN by unicasting the messages using the IP address assigned to the controller 104 or RP 106 to which the message is sent.

The controllers 104 and RPs 106 use Internet Group Management Protocol (IGMP) messages to indicate to the switches 128 which multicast groups should be used with which controllers 104 and RPs 106. In this embodiment, the active controller 104 and the RPs 106 serving a given cell 108 join the downlink timing multicast group and downlink and uplink IQ data multicast groups assigned to that cell 108. In this embodiment, the standby controller 104 does not join any of the downlink timing multicast groups or downlink or uplink IQ data multicast groups for any of the cells 108. The standby controller 104 does this to avoid being overwhelmed by the associated traffic for all of the cells 108.

This approach to configuring the VLANs and multicast groups enables any RP 106 to communicate with any controller 104 in the cluster 138, and any controller 104 in the cluster 138 to communicate with any RP 106. Also, this approach does not require the reconfiguration of the switches 130 and 134 in the event of a fail-over.

In this embodiment, there is a third VLAN that is used for communications between controllers 104 in the cluster 138 and is referred to here as the "controller VLAN." For example, in this example, each controller 104 periodically broadcasts a controller discovery message over the controller VLAN that includes an identifier for that controller 104, the current state of controller 104, a time stamp identifying when the controller 104 transitioned to the current state, and, if appropriate, the virtual cell ID of the cell 108 that controller 104 is serving or is attempting to serve. Each controller 104 immediately broadcasts a controller discovery message over the controller VLAN when the controller 104 transitions to a new state.

Also, each controller 104 that is operating in the active role serving a cell 108 broadcasts a message over the controller VLAN to all the other controllers 104 in the cluster 128 whenever there is a change in any of the in-use parameters used by that controller 104 to serve that cell 108 (which is identified by its virtual cell ID). The message includes all of the in-use parameters used by the sending controller 104 to serve that cell 108. Each controller 104 also sends such an in-use parameter message whenever it discovers that a new controller 104 has joined the cluster 138.

As noted above, each controller 104 is configured to operate in two roles—active role and standby role. However, in order to manage the transitions to and from operating in these two roles in an orderly way, the controllers 104 are configured to transition between various states, in which two of those states are associated with these two roles.

FIG. 3 comprises a high-level flowchart illustrating one exemplary embodiment of a method 300 of determining in which state and role a controller 104 in a C-RAN 100 operates. The embodiment of method 300 shown in FIG. 3 is described here as being implemented in the C-RAN 100 described above in connection with FIG. 1, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that at least some of the processing associated with method 300 (and at least some of the blocks shown in FIG. 3) can occur in a different order (for example, where at least some of the processing associated with at least some of the blocks is performed in parallel and/or in an event-driven manner). Also, most standard exception handling is not described for ease of explanation; however, it is to be understood that method 300 can and typically would include such exception handling.

As noted above, the exemplary embodiment of method 300 shown in FIG. 3 is used in a distributed protection scheme in which each of the controllers 104 independently determines whether to operate in the active role or the standby role. In this exemplary embodiment, each controller 104 operates in at least six states—an initial state in which the controller 104 begins, a provisional active state to which the controller 104 first transitions from the initial state when attempting to serve as the active controller for a target cell by operating in the active role, a confirmed active state to which the controller 104 transitions from the provisional active state and in which the controller 104 operates in the active role, a provisional standby state to which the controller 104 first transitions from the initial state when attempting to serve as the standby controller 104 for the cluster 138 by operating in the standby role, a confirmed standby state to which the controller 104 transitions from the provisional standby state and in which the controller 104 operates in the standby role, and an error state to which the controller 104 transitions when an error occurs.

Each controller 104 maintains a target role (either the active role or the standby role) that is persisted across any booting, rebooting, self-healing operation, or manual intervention performed by or on the controller 104. If the target role for a controller 104 is the active role, then a target cell 108 to serve while in the active role is also persisted. In this embodiment, the target cell 108 is the virtual cell ID for a given group of RPs 106. The target role (and target cell 108) can be configured for each controller 104 using the management system 136.

The particular controller 104 for which method 300 is described here as being performed is referred to here as the "current" controller 104.

The current controller 104 starts in the initial state (block 302). The current controller 104 transitions to the initial state (block 302) from any of the other states when the current controller 104 boots up (for example, when the controller 104 is initially powered on), reboots (for example, in connection with a scheduled reboot such as one performed in connection with a software upgrade or an unscheduled reboot such as one performed in connection with an external error that causes the controller 104 to reboot), performs a self-healing operation after which the controller 104 is not able to maintain its previous state (for example, when the controller 104 attempts to correct an internal error by restarting one or more subsystems or processes of the controller 104 and the restarting of those one or more subsystems is of a nature that prevents the controller 104 from maintaining its previous state), or in response to a manual intervention (for example, when an operator uses the management system 136 to address an error condition) (checked in block 304).

While in the initial state, the current controller 104 joins the cluster 138 (if it has not already done so) and determines its target role and target cell (if applicable for the target role).

If the target role for the current controller 104 is the active role (checked in block 306), the current controller 104 transitions to the provisional active state (block 308). While in the provisional active state, the current controller 104 receives discovery messages broadcast from other controllers 104 in the cluster 138 (block 310). As noted above, each controller 104 in the cluster 138 periodically broadcasts discovery messages over the controller VLAN that includes the current state in which that controller 104 is currently operating, a timestamp indicating when that controller 104 transitioned to that state, and, if in the provisional or confirmed active states, the virtual cell ID of the cell 108 that the controller 104 is attempting to serve (if in the provisional active state) or is currently serving (if in the confirmed active state).

Once "enough" discovery messages have been received, the current controller 104 uses the received discovery messages to determine whether the current controller 104 should graduate to the confirmed active state for the target cell. If the received discovery messages confirm that the current controller 104 should graduate to the confirmed active state for the target cell (checked in block 312), the current controller 104 transitions to the confirmed active state for the target cell (block 314). Otherwise, the current controller 104 transitions to the provisional standby state (block 316).

The determination as to when the current controller 104 has received "enough" discovery messages can be done as follows. The current controller 104 receives discovery messages until it has received a discovery message from all of the discovered controllers 104 or until a predetermined maximum period of time has elapsed. If the predetermined maximum period of time elapses before the current controller 104 receives discovery messages from all of the discovered controllers 104, the current controller 104 must have received discovery messages from a minimum number of the discovered controllers 104. Otherwise, the current controller 104 "re-transitions" to the provisional active state (and, for example, sends another discovery message indicating that it has transitioned to that state). In this embodiment, this minimum number of discovered controllers 104 depends on the number of controllers 104 that have been discovered and corresponds to the minimum number of controllers 104 from which discovery messages would be expected to have been received during the predetermined maximum period of time. In this embodiment, the current controller 104 can re-transition to the provisional active state a maximum number of times, after which it transitions to the error state if the current controller 104 still has not received discovery message from all of the discovered controllers 104 or from the minimum number of the discovered controllers 104 if the predetermined maximum period of time elapses before the current controller 104 receives discovery messages from all of the discovered controllers 104.

In this exemplary embodiment, the current controller 104 uses the received discovery messages to determine whether the current controller 104 should graduate to the confirmed active state for the target cell as follows. If the current controller 104 receives a discovery message indicating that some other controller 104 is operating in the confirmed active state for the target cell, the current controller 104 is not permitted to transition to the confirmed active state to serve as the active controller for the target cell 108. If that is not the case, the current controller 104 checks if it has received any discovery messages from any other controller 104 in the cluster 138 indicating that the other controller 104 is in the provisional active state for the target cell. If it has, there is more than one controller 104 that is attempting to serve as the active controller 104 for the target cell. However, only one controller 104 is permitted to ultimately transition to the confirmed active state for that target cell 108. In this exemplary embodiment, each discovery message includes a time stamp indicating when the associated controller 104 transitioned to the state indicated in that message. In this exemplary embodiment, the one controller 104 that is permitted to ultimately transition to the confirmed active state for the target cell 108 is the controller 104 that first transitioned to the provisional active state for that target cell 108 as indicated by the time stamp in the associated discovery message. The other controllers 104 are not permitted to transition to the confirmed active state for the target cell 108.

If the current controller 104 has not received a discovery message indicating that some other controller 104 is in the confirmed active state or provisional active state for the target cell, the current controller 104 is permitted to transition to the confirmed active state for the target cell 108.

If the target role for the current controller 104 is the standby role, the current controller 104 transitions to the provisional standby state (block 316). While in the provisional standby state, the current controller 104 receives discovery messages broadcast from other controllers 104 in the cluster 138 (block 318).

Once "enough" messages have been received, the current controller 104 uses the received discovery messages to determine whether the current controller 104 should graduate to the confirmed standby state for the cluster 138. If the received discovery messages confirm that the current controller 104 should graduate to the confirmed standby state for the cluster 138 (checked in block 320), the current controller 104 transitions to the confirmed standby state (block 322). Otherwise, the current controller 104 transitions to the error state (block 324).

The determination as to when the current controller 104 has received "enough" discovery messages can be done as described above in connection with blocks 310 and 312.

In this exemplary embodiment, the current controller 104 uses the received discovery messages to determine whether the current controller 104 should graduate to the confirmed standby state for the cluster 138 as follows. If the current controller 104 receives a discovery message indicating that some other controller 104 is operating in the confirmed standby state, the current controller 104 is not permitted to transition to the confirmed standby state to serve as the standby controller. If that is not the case, the current controller 104 checks if it has received any discovery messages from any other controller 104 indicating that the other controller 104 is in the provisional standby state. If it has, there is more than one controller 104 that is attempting to serve as the standby controller 104. However, only one controller 104 is permitted to ultimately transition to the confirmed standby state. In this exemplary embodiment, each discovery message includes a time stamp indicating when the associated controller 104 transitioned to the state indicated in that message. In this exemplary embodiment, the one controller 104 that is permitted to ultimately transition to the confirmed standby state for the cluster 138 is the controller 104 that first transitioned to the provisional standby state as indicated by the time stamp in the associated discovery message. The other controllers 104 are not permitted to transition to the confirmed standby state.

If the current controller 104 has not received a discovery message indicating that some other controller 104 is in the confirmed standby state or provisional standby state for the cluster 138, the current controller 104 is permitted to transition to the confirmed standby state.

The current controller 104 transitions from the error state to the init state (looping back to block 302) if the current controller 104 boots up, reboots, or performs a self-healing operation or in response to a manual intervention (checked in block 304).

FIG. 4 comprises a high-level flow chart illustrating one exemplary embodiment of a method 400 of determining when to perform a fail-over in a C-RAN 100. The embodiment of method 400 shown in FIG. 4 is described here as being implemented in the C-RAN 100 described above in connection with FIG. 1, though it is to be understood that other embodiments can be implemented in other ways.

The blocks of the flow diagram shown in FIG. 4 have been arranged in a generally sequential manner for ease of explanation; however, it is to be understood that this arrangement is merely exemplary, and it should be recognized that at least some of the processing associated with method 400 (and at least some of the blocks shown in FIG. 4) can occur in a different order (for example, where at least some of the processing associated with at least some of the blocks is performed in parallel and/or in an event-driven manner). Also, most standard exception handling is not described for ease of explanation; however, it is to be understood that method 400 can and typically would include such exception handling.

The particular controller 104 for which method 400 is described here as being performed is referred to here as the "current" controller 104.

In this exemplary embodiment, the controllers 104 are configured so that when they are serving as an active controller 104 for a cell 108 and determine that they are failing and need the standby controller 104 to perform a fail-over to take over serving the cell 108, the failing controller 104 broadcasts a message indicating that it is failing on the controller VLAN. This message is also referred here as a "failure message." Each failure message identifies the failing controller 104 that sent the message and the virtual cell ID for the cell 108 being served by that controller 104. If the standby controller 104 receives a failure message (checked in block 402), the standby controller 104 performs a fail-over to take over serving as the active controller 104 for the cell 108 previously served by the controller 104 that sent the failure message (block 404).

In this exemplary embodiment, the controllers 104 in the cluster 138 are configured to periodically broadcast a heartbeat message. Each heartbeat message identifies the controller 104 that sent the message and the virtual cell ID of the cell 108 being served by that controller 104. If a predetermined period of time elapses without the standby controller 104 receiving a heartbeat message from a controller 104 that is serving a cell 108 (checked in block 406), the standby controller 104 performs a fail-over to take over serving as the active controller 104 for the cell 108 previously served by that controller 104 (block 404).

FIG. 4 illustrate only one example of a method of determining when to perform a fail-over in a C-RAN 100; it is to be understood that this can be done in other ways.

FIG. 5 comprises a high-level flow chart illustrating one exemplary embodiment of a method 500 of performing a fail-over in connection with the failure of an active controller 104 in a C-RAN 100. The embodiment of method 500 shown in FIG. 5 is described here as being implemented in the C-RAN 100 described above in connection with FIG. 1, though it is to be understood that other embodiments can be implemented in other ways.

The blocks of the flow diagram shown in FIG. 5 have been arranged in a generally sequential manner for ease of explanation; however, it is to be understood that this arrangement is merely exemplary, and it should be recognized that at least some of the processing associated with method 500 (and at least some of the blocks shown in FIG. 5) can occur in a different order (for example, where at least some of the processing associated with at least some of the blocks is performed in parallel and/or in an event-driven manner). Also, most standard exception handling is not described for ease of explanation; however, it is to be understood that method 300 can and typically would include such exception handling.

The processing associated with method 500 is performed in response to an active controller 104 in the cluster 138 failing. The particular cell 108 that the failed controller 104 was serving prior to the failure is referred to here as the "current" cell 108. The current cell 108 is generally identified using its virtual cell ID.

Method 500 comprises replicating, by the standby controller 104, the failed controller 104 (block 502). This means the standby controller 104 configures itself to use the most-recent in-use parameters that the failed controller 104 had pushed to the standby controller 104. As noted above, each active controller 104 broadcasts a message that includes its current in-use parameters periodically and whenever its in-use parameters change. Also, as noted above, the "in-use" parameters for an active controller 104 can include, for example, all parameters that are manually configured and all parameters determined via self-organizing network (SON) processes performed by or for the failed controller 104 prior to the failure, except for the LTE SIB1 Cell Identity and eNodeB identifier assigned to the failed controller 104. In general, the in-use parameters include all parameters it would need to start serving a cell 108 in the event of a failure of the active controller 104.

As a part of replicating the failed controller 104, the standby controller 104 joins the multicast groups associated with the current cell 108. In this example embodiment, these multicast groups include the downlink timing multicast group and downlink and uplink IQ data multicast groups assigned to the current cell 108. The standby controller 104 does this by sending IGMP messages that causes the switches 130 and 134 to include the standby controller 104 in, and remove the failed controller 104 from, the multicast groups associated with the current cell 108. In response, the switches 130 and 134 re-configure the multicast groups accordingly.

Method 500 further comprises refreshing, by the standby controller 104, its backhaul connection (block 504). In this embodiment, the standby controller 104 does this by performing a S1 reset by sending either S1 SETUP REQUEST message or an S1 ENB CONFIGURATION UPDATE message (depending on which message is appropriate given the current state of the backhaul S1 connection). In either case, the MME 118 refreshes the S1 connection and sends a S1 SETUP RESPONSE message to the standby controller 104 with the current operational parameters that the controller 104 should use in connection the LTE SIB1 Cell Identity.

Method 500 further comprises homing the RPs 106 serving the current cell 108 to the standby controller 104 (block 506). In one approach, the standby controller 104 initiates the homing process by sending homing messages to the RPs 106. The homing messages include the one or more IP addresses assigned to the standby controller 104 that the RPs 106 should use in communicating with the controller 104. In response to receiving such messages, the RPs 106 will recognize the standby controller 104 as their new serving controller 104 and use the communicated IP addresses to communicate with the standby controller 104. Also, the RPs 106, in response to receiving such homing messages, will enter a disabled state in which they do not transmit over the air interface. As a result of this homing process, the group of RPs 106 associated with the virtual cell ID of the current cell 108 is associated with the LTE SIB1 Cell Identity assigned to the standby controller 104.

In another approach, each such RP 106 detects when it is no longer able to communicate with the controller 104 to which it is currently homed. In response to detecting this, the RP 106 enters a disabled state in which it does not transmit over the air interface and transmits discovery messages over the front-haul 124 to the controllers 104 in the cluster 138. In response to receiving such discovery messages from the RPs 106 serving the current cell 106, the standby controller 104 will recognize those RPs 106 as being assigned to the current cell 108 and will transmit homing messages to the RPs 106. As with the previous approach, the homing messages include the one or more IP addresses assigned to the standby controller 104 that the RPs 106 should use in communicating with the controller 104. In response to receiving such homing messages, the RPs 106 will recognize the standby controller 104 as their new serving controller 104 and use the communicated IP addresses to communicate with the standby controller 104. As a result of this homing process, the group of RPs 106 associated with the virtual cell ID of the current cell 108 is associated with the LTE SIB1 Cell Identity assigned to the standby controller 104.

Method 500 further comprises configuring the re-homed RPs 106 with the current operational parameters for the LTE SIB1 Cell Identity (block 508) and enabling the RPs 106 (block 510). Configuring the re-homed RPs 106 with the current operational parameters for the LTE SIB1 Cell Identity can be done by the standby controller 104 sending a message to the RPs 106 over the timing VLAN that includes the current operational parameters provided to the standby controller 104 in connection with block 504. Enabling the RPs 106 comprises causing the RPs 106 to start transmitting over the air interface using the current operational parameters.

Method 500 further comprises assuming, by the standby controller 104, the active role for the current cell 108 (block 512). The standby controller 104 is at this point referred to as the "new active controller 104." The new active controller 104, among other things, services incoming messages from UEs 112 and implements the end points for the LTE GPRS Tunneling Protocol (GTP) tunnels for the UEs 112. Also, the new active controller 104 acts as timing master for RPs 106 assigned to the current cell 108 and sends downlink timing messages using the downlink timing multicast group assigned to the current cell 108. Also, the RPs 106 sends uplink timing messages to the new active controller 104 using the IP address assigned to the new active controller 104 for that purpose. The new active controller 104 and RPs 106 exchange downlink and uplink IQ data over the IQ VLAN using the downlink and uplink IQ data multicast groups assigned to the current cell 108.

Method 500 further comprises informing the other controllers 104 in the cluster 138 that the new active controller 104 is now serving the current cell 108 (block 514). The new active controller 104 does this by sending a special discovery message that is used for this purpose. In response to receiving such a message, the other controllers 104 update the cluster information they maintain accordingly.

After performing the processing associated with method 500, the new active controller 104 will serve the current cell 108 in the same manner that the failed controller 104 did prior to failure.

As noted above, in this exemplary embodiment described in connection with FIGS. 3-5, the system 100 is configured to use a protection scheme in which the respective group of radio points 106 that serve each of the cells 108 does not change in the event of a fail-over. In this way, the RF plan established for the site 102 does not change in the event of a fail-over. Moreover, in this exemplary embodiment described in connection with FIGS. 3-5, a distributed protection scheme is used in which each of the controllers 104 independently determines whether to operate in the active role or the standby role, which reduces the complexity that would otherwise be required if a centralized protection scheme were used.

It is to be understand, however, that the techniques described here can be used in other embodiments. For example, the techniques described here can be used in systems in which more than one controller 104 serves each cell 108, systems in which each controller 104 serves more than one cell 104, and/or systems in which more than one controller serves as a standby controller 104 for the cluster 138.

Also, a centralized protection scheme in which one of the controllers 104 operates as a "cluster manager" that controls and manages the protection functions can be used. Such a cluster manager can also be implemented in an entity separate from the controllers 104. In some embodiments in which a centralized protection scheme is used, provisional states (like those described above in connection with FIG. 3) are not used. Instead, the cluster manager determines in which role (active or standby) each controller 104 in the cluster 138 should operate at each point in time and instructs each controller 104 to transition to the appropriate role when necessary. Because the cluster manager determines the roles for all of the controllers 104 in the cluster 138, the cluster manager can instruct each controller 104 to transition directly to the appropriate role without first transitioning to a provisional state.

Other embodiments are also possible.

For example, as noted above, in other embodiments, more than one controller 104 serves as a standby controller 104 for the cluster 138. That is, in such embodiments, a N+M protection scheme is used in which, in the absence of any faults, N controllers 104 operate in the active role and M controllers 104 operate in the standby role. In such embodiments, each of the standby controllers 104 can have an associated rank, and when a fail-over is performed, the highest-ranking (or lowest-ranking) standby controller 104 can transition to operating in the active role in place of the failed controller 104. Various schemes can be used for ranking the standby controllers 104 (for example, the ranks can be preassigned (for example, based on the MAC address) or determined based on when the controller 104 transitioned to the standby role (for example, where the newest controller 104 is assigned either the lowest or highest rank). Other N+M protection schemes can be used. By using a protection scheme in which multiple controllers 104 can serve as a standby controller 104, multiple controller failures can be addressed, with the trade-off of additional cost and complexity of having multiple standby controllers 104.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system to provide wireless service comprising: a plurality of controllers; and a plurality of radio points; wherein each of the radio points is associated with at least one antenna and remotely located from the controllers, wherein the plurality of radio points is communicatively coupled to the controllers using a front-haul network; wherein the controllers and the plurality of radio points are configured to implement a plurality of base stations in order to provide wireless service to a plurality of user equipment (UEs); wherein each of the controllers is communicatively coupled to a core network of a wireless service provider; wherein the system is configured to serve a plurality of logical cells; wherein the system is configured so that each logical cell is served by a respective group of the radio points; wherein the system is configured to associate each group of radio points with a respective one or more controllers in order for the respective one or more controllers to serve the respective logical cell associated with that group of radio points while associated therewith; and wherein the system is configured to use a protection scheme in which the respective group of radio points that serves each logical cell does not change in the event of a fail-over that causes the one or more controllers associated with that group of radio points to change.

Example 2 includes the system of Example 1, wherein the protection scheme comprises a distributed protection scheme in which each of the controllers independently determines whether to operate in one of an active role or a standby role.

Example 3 includes the system of any of Examples 1-2, wherein each logical cell has an associated virtual cell identifier and each of the base stations implemented by the controllers has an associated base station identifier and cell identity recognized by the core network; and wherein the system is configured to associate each group of radio points with a respective one or more controllers in order for the respective one or more controllers to serve the respective logical cell associated with that group of radio points while associated therewith by: associating the virtual cell identifier for each logical cell with the respective base station identifier and cell identity recognized by the core network that is associated with the one or more controllers serving that logical cell.

Example 4 includes the system of any of Examples 1-3, wherein the protection scheme comprises an N+1 protection scheme in which at most one of the controllers operates in a standby role.

Example 5 includes the system of any of Examples 1-4, wherein the protection scheme comprises an N+M protection scheme in which multiple controllers can operate in a standby role.

Example 6 includes the system of any of Examples 1-5, wherein each of the logical cells is served by a respective one of the controllers operating in an active role.

Example 7 includes the system of any of Examples 1-6, wherein the system is configured so that the following occurs in connection with a first controller included in the plurality of controllers that is operating in a standby role taking over serving one of the logical cells in place of a second controller included in the plurality of controllers that has failed, the second controller, prior to the failure, operating in an active role for that logical cell and included in the respective one or more controllers serving that logical cell: replicating the second controller by the first controller; refreshing a backhaul connection for the first controller; homing the group of radio points serving that logical cell to the first controller; configuring the group of radio points serving that logical cell with current operational parameters for that logical cell; enabling the group of radio points serving that logical cell to start transmitting over an air interface using the current operational parameters; operating the first controller in the active role serving that logical cell; and informing the other controllers that the first controller is now operating in the active role serving that logical cell.

Example 8 includes the system of any of Examples 1-7, wherein each of the controllers is configured to operate in one of: an active role in which the controller serves a respective at least one of the logical cells; and a standby role in which the controller serves as a standby controller configured to take over for one of the controllers operating in the active role that has failed.

Example 9 includes the system of any of Examples 1-8, wherein the system is configured so that the controllers exchange discovery messages, each discovery message sent by a respective controller indicates a state in which the respective controller is operating and a time when the respective controller transitioned to the state in which the respective controller is operating; wherein each controller that intends to operate in an active role for one of the logical cells first transitions to a prospective active state in which the controller determines whether to graduate to a confirmed active state in which the controller operates in the active role serving the one of the logical cells as a function of any discovery messages received by the controller while in the prospective active state; and wherein each controller that intends to operate in the standby role first transitions to a prospective standby state in which the controller determines whether to graduate to a confirmed standby state in which the controller operates in the standby role as a function of any discovery messages received by the controller while in the prospective standby state.

Example 10 includes the system of any of Examples 1-9, wherein the front-haul network is configured so that each of the radio points is able to communicate with each of the other controllers using the front-haul network.

Example 11 includes the system of any of Examples 1-10, wherein the fail-over that causes the one or more controllers associated with that group of radio points to change is performed in response to one of: receiving a fail-over request message from a controller included in the one or more controllers associated with that group of radio points; and failing to receive an expected message from a controller included in the one or more controllers associated with that group of radio points within a predetermined period of time.

Example 12 includes a method of implementing a protection scheme in a system configured to provide wireless service that comprises a plurality of controllers and a plurality of radio points, wherein each of the radio points is associated with at least one antenna and remotely located from the controllers, wherein the plurality of radio points is communicatively coupled to the controllers using a front-haul network, wherein the controllers and the plurality of radio points are configured to implement a plurality of base stations in order to provide wireless service to a plurality of user equipment (UEs), and wherein each of the controllers is communicatively coupled to a core network of a wireless service provider, wherein the system is configured to serve a plurality of logical cells, and wherein the system is configured so that each logical cell is served by a respective group of the radio points, the method comprising: associating each group of radio points with a respective one or more controllers in order for the respective one or more controllers to serve the respective logical cell associated with that group of radio points while associated therewith; and using a protection scheme in which the respective group of radio points that serves each logical cell does not change in the event of a fail-over that causes the one or more controllers associated with that group of radio points to change.

Example 13 includes the method of Example 12, wherein the protection scheme comprises a distributed protection scheme in which each of the controllers independently determines whether to operate in one of an active role or a standby role.

Example 14 includes the method of any of Examples 12-13, wherein each logical cell has an associated virtual cell identifier and each of the base stations implemented by the controllers has an associated base station identifier and cell identity recognized by the core network; and wherein associating each group of radio points with a respective one or more controllers in order for the respective one or more controllers to serve the respective logical cell associated with that group of radio points while associated therewith comprises: associating the virtual cell identifier for that logical cell with the respective base station identifier and cell identity recognized by the core network that is associated with the one or more controllers serving that logical cell.

Example 15 includes the method of any of Examples 12-14, wherein the protection scheme comprises an N+1 protection scheme in which at most one of the controllers operates in a standby role.

Example 16 includes the method of any of Examples 12-15, wherein the protection scheme comprises an N+M protection scheme in which multiple controllers can operate in a standby role.

Example 17 includes the method of any of Examples 12-16, wherein each of the logical cells is served by a respective one of the controllers operating in an active role.

Example 18 includes the method of any of Examples 12-17, wherein using the protection scheme in which the respective group of radio points that serves each logical cell does not change in the event of a fail-over that causes the one or more controllers associated with that group of radio points to change comprises: in connection with a first controller included in the plurality of controllers that is operating in a standby role taking over serving one of the logical cells in place of a second controller included in the plurality of controllers that has failed, the second controller, prior to the failure, operating in an active role for that logical cell and included in the respective one or more controllers serving that logical cell: replicating, by the first controller, the second controller, refreshing a backhaul connection for the first controller; homing the group of radio points serving that logical cell to the first controller; configuring the group of radio points serving that logical cell with current operational parameters for that logical cell; enabling the group of radio points serving that logical cell to start transmitting over an air interface using the current operational parameters; operating the first controller in the active role serving that logical cell; and informing the other controllers that the first controller is now operating in the active role serving that logical cell.

Example 19 includes the method of any of Examples 12-18, wherein each of the controllers is configured to operate in one of: an active role in which the controller serves a respective at least one of the logical cells; and a standby role in which the controller serves as a standby controller configured to take over for one of the controllers operating in the active role that has failed.

Example 20 includes the method of any of Examples 12-19, further comprising: exchanging, by the controllers, discovery messages, each discovery message sent by a respective controller indicates a state in which the respective controller is operating and a time when the respective controller transitioned to the state in which the respective controller is operating; first transitioning each controller that intends to operate in an active role for one of the logical cells to a prospective active state in which the controller determines whether to graduate to a confirmed active state in which the controller operates in the active role serving the one of the logical cells as a function of any discovery messages received by the controller while in the prospective active state; and first transitioning each controller that intends to operate in the standby role to a prospective standby state in which the controller determines whether to graduate to a confirmed standby state in which the controller operates in the standby role as a function of any discovery messages received by the controller while in the prospective standby state.

Example 21 includes the method of any of Examples 12-20, wherein the front-haul network is configured so that each of the radio points is able to communicate with each of the other controllers using the front-haul network.

Example 22 includes the method of any of Examples 12-21, wherein the fail-over that causes the one or more controllers associated with that group of radio points to change is performed in response to one of: receiving a fail-over request message from a controller included in the one or more controllers associated with that group of radio points; and failing to receive an expected message from a controller included in the one or more controllers associated with that group of radio points within a predetermined period of time.

What is claimed:

1. A system to provide wireless service comprising:
a plurality of controllers; and
a plurality of radio points;
wherein each of the radio points is associated with at least one antenna and remotely located from the controllers, wherein the plurality of radio points is communicatively coupled to the controllers using a front-haul network;
wherein the controllers and the plurality of radio points are configured to implement a plurality of base stations in order to provide wireless service to a plurality of user equipment (UEs);
wherein each of the controllers is communicatively coupled to a core network of a wireless service provider;
wherein the system is configured to serve a plurality of logical cells;
wherein the system is configured so that each logical cell is served by a respective group of the radio points;
wherein the system is configured to associate each group of radio points with a respective one or more controllers in order for the respective one or more controllers to serve the respective logical cell associated with that group of radio points while associated therewith;
wherein the system is configured to use a protection scheme in which the respective group of radio points that serves each logical cell does not change in the event of a fail-over that causes the one or more controllers associated with that group of radio points to change; and
wherein when a first controller included in the plurality of controllers that is operating in a standby role takes over serving one of the logical cells in place of a second controller in the plurality of controllers that was previously actively serving that cell, where the second controller has failed, the system is configured to:
replicate the second controller by the first controller;
home the group of radio points serving that logical cell to the first controller.

2. The system of claim 1, wherein the protection scheme comprises a distributed protection scheme in which each of the controllers independently determines whether to operate in one of an active role or a standby role.

3. The system of claim 1, wherein each logical cell has an associated virtual cell identifier and each of the base stations implemented by the controllers has an associated base station identifier and cell identity recognized by the core network; and
wherein the system is configured to associate each group of radio points with a respective one or more controllers in order for the respective one or more controllers to serve the respective logical cell associated with that group of radio points while associated therewith by:
associating the virtual cell identifier for each logical cell with the respective base station identifier and cell identity recognized by the core network that is associated with the one or more controllers serving that logical cell.

4. The system of claim 1, wherein the protection scheme comprises an N+1 protection scheme in which at most one of the controllers operates in a standby role.

5. The system of claim 1, wherein the protection scheme comprises an N+M protection scheme in which multiple controllers can operate in a standby role.

6. The system of claim 1, wherein each of the logical cells is served by a respective one of the controllers operating in an active role.

7. The system of claim 1, wherein the system is configured so that the following occurs in connection with the first controller taking over serving one of the logical cells in place of the second controller that has failed:
refreshing a backhaul connection for the first controller;
configuring the group of radio points serving that logical cell with current operational parameters for that logical cell;
enabling the group of radio points serving that logical cell to start transmitting over an air interface using the current operational parameters;
operating the first controller in the active role serving that logical cell; and
informing the other controllers that the first controller is now operating in the active role serving that logical cell.

8. The system of claim 1, wherein each of the controllers is configured to operate in one of:
an active role in which the controller serves a respective at least one of the logical cells; and
a standby role in which the controller serves as a standby controller configured to take over for one of the controllers operating in the active role that has failed.

9. The system of claim 1, wherein the system is configured so that the controllers exchange discovery messages, each discovery message sent by a respective controller indicates a state in which the respective controller is operating and a time when the respective controller transitioned to the state in which the respective controller is operating;
wherein each controller that intends to operate in an active role for one of the logical cells first transitions to a prospective active state in which the controller determines whether to graduate to a confirmed active state in which the controller operates in the active role serving the one of the logical cells as a function of any discovery messages received by the controller while in the prospective active state; and
wherein each controller that intends to operate in the standby role first transitions to a prospective standby state in which the controller determines whether to graduate to a confirmed standby state in which the controller operates in the standby role as a function of any discovery messages received by the controller while in the prospective standby state.

10. The system of claim 1, wherein the front-haul network is configured so that each of the radio points is able to communicate with each of the other controllers using the front-haul network.

11. The system of claim 1, wherein the fail-over that causes the one or more controllers associated with that group of radio points to change is performed in response to one of:

receiving a fail-over request message from a controller included in the one or more controllers associated with that group of radio points; and failing to receive an expected message from a controller included in the one or more controllers associated with that group of radio points within a predetermined period of time.

12. A method of implementing a protection scheme in a system configured to provide wireless service that comprises a plurality of controllers and a plurality of radio points, wherein each of the radio points is associated with at least one antenna and remotely located from the controllers, wherein the plurality of radio points is communicatively coupled to the controllers using a front-haul network, wherein the controllers and the plurality of radio points are configured to implement a plurality of base stations in order to provide wireless service to a plurality of user equipment (UEs), and wherein each of the controllers is communicatively coupled to a core network of a wireless service provider, wherein the system is configured to serve a plurality of logical cells, and wherein the system is configured so that each logical cell is served by a respective group of the radio points, the method comprising:

associating each group of radio points with a respective one or more controllers in order for the respective one or more controllers to serve the respective logical cell associated with that group of radio points while associated therewith; and using a protection scheme in which the respective group of radio points that serves each logical cell does not change in the event of a fail-over that causes the one or more controllers associated with that group of radio points to change; and exchanging, by the controllers, discovery messages, wherein each discovery message sent by a respective controller indicates a state in which the respective controller is operating and a time when the respective controller transitioned to the state in which the respective controller is operating.

13. The method of claim 12, wherein the protection scheme comprises a distributed protection scheme in which each of the controllers independently determines whether to operate in one of an active role or a standby role.

14. The method of claim 12, wherein each logical cell has an associated virtual cell identifier and each of the base stations implemented by the controllers has an associated base station identifier and cell identity recognized by the core network; and wherein associating each group of radio points with a respective one or more controllers in order for the respective one or more controllers to serve the respective logical cell associated with that group of radio points while associated therewith comprises:

associating the virtual cell identifier for that logical cell with the respective base station identifier and cell identity recognized by the core network that is associated with the one or more controllers serving that logical cell.

15. The method of claim 12, wherein the protection scheme comprises an N+1 protection scheme in which at most one of the controllers operates in a standby role.

16. The method of claim 12, wherein the protection scheme comprises an N+M protection scheme in which multiple controllers can operate in a standby role.

17. The method of claim 12, wherein each of the logical cells is served by a respective one of the controllers operating in an active role.

18. The method of claim 12, wherein using the protection scheme in which the respective group of radio points that serves each logical cell does not change in the event of a fail-over that causes the one or more controllers associated with that group of radio points to change comprises:

in connection with a first controller included in the plurality of controllers that is operating in a standby role taking over serving one of the logical cells in place of a second controller included in the plurality of controllers that has failed, the second controller, prior to the failure, operating in an active role for that logical cell and included in the respective one or more controllers serving that logical cell:

replicating, by the first controller, the second controller, refreshing a backhaul connection for the first controller;

homing the group of radio points serving that logical cell to the first controller;

configuring the group of radio points serving that logical cell with current operational parameters for that logical cell;

enabling the group of radio points serving that logical cell to start transmitting over an air interface using the current operational parameters;

operating the first controller in the active role serving that logical cell; and informing the other controllers that the first controller is now operating in the active role serving that logical cell.

19. The method of claim 12, wherein each of the controllers is configured to operate in one of:

an active role in which the controller serves a respective at least one of the logical cells; and a standby role in which the controller serves as a standby controller configured to take over for one of the controllers operating in the active role that has failed.

20. The method of claim 12, the method further comprising:

first transitioning each controller that intends to operate in an active role for one of the logical cells to a prospective active state in which the controller determines whether to graduate to a confirmed active state in which the controller operates in the active role serving the one of the logical cells as a function of any discovery messages received by the controller while in the prospective active state; and first transitioning each controller that intends to operate in the standby role to a prospective standby state in which the controller determines whether to graduate to a confirmed standby state in which the controller operates in the standby role as a function of any discovery messages received by the controller while in the prospective standby state.

21. The method of claim 12, wherein the front-haul network is configured so that each of the radio points is able to communicate with each of the other controllers using the front-haul network.

22. The method of claim 12, wherein the fail-over that causes the one or more controllers associated with that group of radio points to change is performed in response to one of:

receiving a fail-over request message from a controller included in the one or more controllers associated with that group of radio points; and failing to receive an expected message from a controller included in the one or more controllers associated with that group of radio points within a predetermined period of time.

* * * * *